(12) United States Patent  
Counterman (10) Patent No.: US 6,724,727 B2
(45) Date of Patent: Apr. 20, 2004

(54) POLICY-BASED FORWARD ERROR CORRECTION IN PACKET NETWORKS

(75) Inventor: Raymond Counterman, Canton, MA (US)

(73) Assignee: Nokia Corporation (FI)

( * ) Notice: Subject to any disclaimer, the term of this patent is extended or adjusted under 35 U.S.C. 154(b) by 155 days.

(21) Appl. No.: 10/007,057

(22) Filed: Dec. 3, 2001

(65) Prior Publication Data

US 2003/0103465 A1 Jun. 5, 2003

(51) Int. Cl.[7] .............................................. G01R 31/08
(52) U.S. Cl. ....................... 370/235; 370/468; 370/412; 370/535
(58) Field of Search ................................. 370/389, 338, 370/349, 412–416, 352–356, 252, 428, 429, 395.2, 395.21, 230, 235, 535, 468, 238, 238.1; 709/239, 241; 714/784, 746

(56) References Cited

U.S. PATENT DOCUMENTS

| | | | | |
|---|---|---|---|---|
| 5,892,754 A | * | 4/1999 | Kompella et al. | 370/236 |
| 5,910,951 A | * | 6/1999 | Pearce et al. | 370/351 |
| 6,088,368 A | | 7/2000 | Rubinstain et al. | |
| 6,104,700 A | | 8/2000 | Haddock et al. | |
| 6,104,720 A | | 8/2000 | Kisor | |
| 6,301,244 B1 | * | 10/2001 | Huang et al. | 370/351 |
| 6,363,053 B1 | * | 3/2002 | Schuster et al. | 370/230 |
| 6,449,259 B1 | * | 9/2002 | Allain et al. | 370/253 |
| 2001/0032272 A1 | * | 10/2001 | Fujita | 709/241 |
| 2002/0114332 A1 | * | 8/2002 | Apostolopoulos et al. | 370/392 |
| 2002/0154648 A1 | * | 10/2002 | Araya et al. | 370/412 |

OTHER PUBLICATIONS

International Search Report, International Application No. PCT/1B02/05062, Dec. 2, 2002.

* cited by examiner

Primary Examiner—Ajit Patel
(74) Attorney, Agent, or Firm—Banner & Witcoff, Ltd.

(57) ABSTRACT

The present invention provides a method and apparatus for a communications system that prioritizes packets that are transmitted over a digital communication channel utilizing at least one error-correcting transmission path associated with a Quality of Service (QoS) objective. The QoS objective is used to select the appropriate transmission path (that may include forward error coding, scrambling, and interleaving) that satisfies the relevant metrics of the desired level of service quality such as packet latency, variation of the packet latency, information throughput, and packet error rate (PER). The communications system selects a transmission path that is associated with QoS objectives best matched to the QoS objectives as required by the originating application.

32 Claims, 5 Drawing Sheets

POLICY-BASED FORWARD ERROR CORRECTION IN PACKET NETWORKS

FIELD OF THE INVENTION

This invention relates to a communications system for classifying and forwarding packets for transmission over a digital communication channel.

BACKGROUND OF THE INVENTION

With the evolution of communication services toward a greater penetration of packet transmission, a packet network may need to support a plurality of applications for voice services and video services. However, different types of services have different requirements in order to achieve the objectives of quality of service (QoS). Time latency and packet error rate (PER) are often used to describe the QoS objectives. Voice services typically require a small time latency (which is associated with the delay of the voice signal). On the other hand, entertainment broadcast video typically requires a small packet error rate but does not require a small time latency. Moreover, the processing required for providing a small packet error rate often entails substantial error correcting processing when the signal is transmitted over an imperfect communication channel. If a packet network serves entertainment broadcast video, one would configure the packet network to have a large degree of error correcting capability in order to guarantee a small packet error rate at the expense of a greater time latency. However, this policy may not provide satisfactory support for voice service if the same packet network is concurrently serving applications for voice services.

With the prior art, a single forward error correction (FEC) path is often chosen that is a compromise between a reasonable packet error rate and a reasonable delay; however, this approach is not an optimal solution because either there is more delay for voice signals than desired or a higher packet error rate than is desirable for video services. Another conventional approach is to utilize more one than one forward error correction path; however, only one FEC path can be used at a given time. In other words, FEC paths cannot be used concurrently. However, a packet switch may serve different types of services at a given time.

There is a need for a packet network to have the capability of selecting the FEC path that best meets the QoS objectives for applications supporting different services such as video services and voice services.

SUMMARY OF THE INVENTION

The present invention provides a method and apparatus for a communications system that classifies packets that are transmitted over a digital communication channel with at least one error-correcting transmission path. Quality of Service (QoS) objectives are used to select the appropriate transmission path that satisfies the relevant metrics of service quality such as packet latency, variance of the packet latency, information throughput, and packet error rate (PER). One transmission path supports forward error correction with an associated amount of time latency that is consistent with the QoS objectives of an originating application. The communications system manages, monitors, and prioritizes packets and allocates bandwidth with a packet network in order to satisfy the QoS objectives associated with the originating application. The communications system configures the transmission path according to QoS objectives and bandwidth requirements and selects a transmission path that is associated with QoS objectives best matched to the QoS objectives as required by the originating application. The processing of the packet optionally includes scrambling and interleaving of the packet. A packet can be reclassified with respect to QoS and bandwidth requirements in order to adjust the policy-based communications system to varying service demands. Alternatively, available bandwidth can be re-allocated among the plurality of transmission paths. The receiver, in accordance with the present invention, utilizes corresponding inverse functions to deliver packets to the terminating application.

DETAILED DESCRIPTION OF THE INVENTION

Figure 1:
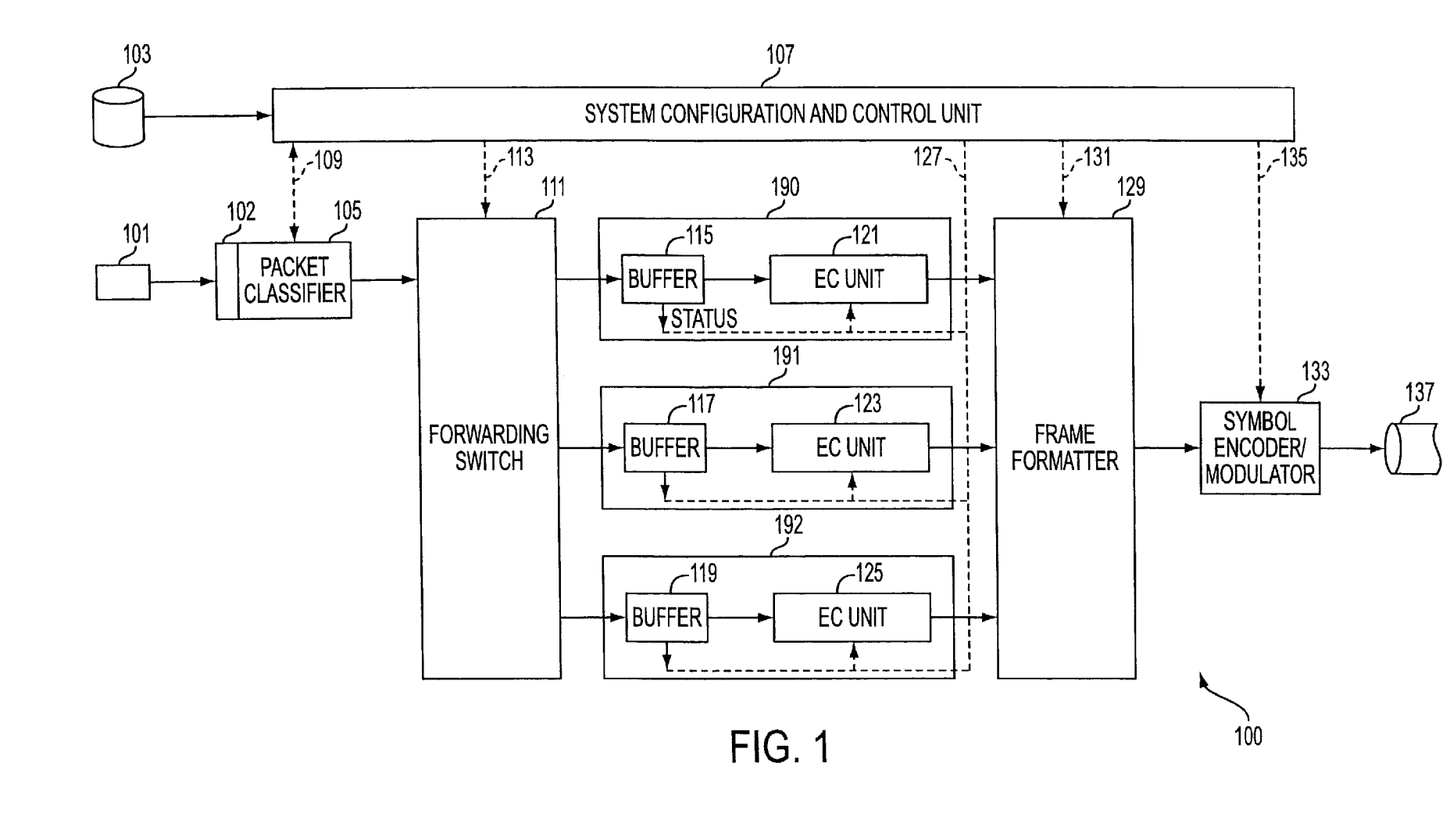
FIG. 1 shows an architecture of a communications system using forward error correction in a packet network.

FIG. 1 shows an architecture of a communications system 100 using forward error correction according to the present invention. Communications system 100 delivers packets from an application that supports a service (e.g. videoconferencing) for a user. Packet 101 is delivered from data port 102 to transmission medium 137. Communications system 100 utilizes a mechanism (comprising system configuration and control unit 107, packet classifier 105, and forwarding switch 111 as described later) in order to process and transport packet 101 in accordance with the desired level of quality of service. Transmission medium 137 can assume one of different media forms including a radio link (wireless), a cable connection, a microwave connection, or a fiber optic connection. Moreover, packet 101 can be transported by tandeming different forms of transmission media to form transmission medium 137.

Packet 101 is delivered according to a policy in which a level of quality of service (QoS) is associated with a user generating packet 101, with the service that the user is requesting, and with the application (software program and as identified by the UDP port number, for example) supporting the service. The quality of service is determined by one or more attributes that include time latency of the packet, variation of the time latency, information throughput for the user, and the packet error rate (PER). Some applications (e.g. entertainment video) require a very low packet error rate but do not require a small time latency (i.e. delay of packets). On the other hand, there are other applications (e.g. voice) that typically require a small time latency but can tolerate a greater packet error rate. With a number of applications, one can trade the performance of one QoS attribute (e.g. time latency) for another QoS attribute (e.g. forward error correcting robustness) in order to satisfy the needs of a particular application.

With communications system 100, database 103 provides policy information to system configuration and control unit 107 about the QoS level and the bandwidth allocated for the user of the application that provides a service. The policy is a set of assignment rules associated with a user and a desired QoS level. Typically, the policy is constructed in accordance with a service agreement between the user and a service provider. As an example, user A may have a higher QoS level than user B, in which packets are delivered quicker for user A than user B with the same packet error rate and in which user A has a greater throughput bandwidth than user B. The policy may have finer granularity by distinguishing the service and application being utilized for a given user. Packet 101 contains a priority indicator (such as a p value as supported in Standard IEEE 802.1Q). Packet classifier 105 receives packet 101 from the application and utilizes the priority indicator and policy information that is provided by system configuration and control unit 107 from database 103 over bus 109 to determine the QoS level and bandwidth allocation that is to be associated with packet 101. Packet classifier 105 determines required transmission attributes that must be provided by a transmission path (which will be discussed subsequently) and forwards packet 101 with the required transmission attributes to forwarding switch 111.

In order to adjust communications system 100 to varying service demands, packet classifier 105 can reclassify packet 101 with respect to QoS and bandwidth objectives. Configuration and control unit 107 determines a current demand of bandwidth resources by monitoring the buffer status on bus 127. For example, if the policy associates a time latency of 1.5 msec and a PER of 1% for packet 101 and communications system 100 is experiencing traffic congestion, packet classifier 105 may redirect packet 101 to a transmission path (not illustrated in FIG. 1) that provides a time latency of 2 msec and a PER of 2% until the traffic congestion is allayed. At that point of time, packet classifier 105 may redirect packet 101 to the original transmission path having a time latency of 1.5 msec and a PER of 1%. Alternatively, system configuration and control unit 107 may instruct frame formatter 129 to increase the bandwidth allocated to the current transmission path. While maintaining the desired quality of service for the user, this approach may temporarily disrupt transmitting other packets in the frame.

Forwarding switch 111 may also receive additional information such as the current bandwidth usage of communications system 100 over bus 113 from system configuration and control unit 107 for directing packet 101 to a transmission path. Forwarding switch 111 consequently directs packet 101 to a specific transmission path (190, 191, or 192). FIG. 1 depicts three transmission paths: transmission path 190 comprising buffer 115 and error correction unit (EC) 121; transmission path 191 comprising buffer 117, error correction unit 123; and transmission path 192 comprising buffer 119 and error correction unit 125. Transmission paths 190, 191, and 192 can differ in that each path can be associated with different levels of quality of service. Buffers 115, 117, and 119 stores packet 101 if a previously transmitted packet is currently being processed by the associated error correction unit. Error correction units 121, 123, and 125 process packet 101 by adding coding bits that are used at the receiving side in order to correct any errors resulting from the transmission of packet 101 over transmission medium 137. Even though transmission paths 190, 191, and 192 are separate logical paths, each path can be implemented as separate physical paths.

Frame formatter 129 receives processed packets from transmission paths 190, 191, and 192 and multiplexes the packets (such as processed packet 101) into a frame. The bandwidth associated with a particular transmission path is directly related to the number of bits associated with a particular transmission path in the frame. The bandwidth allocated to a particular transmission path is increased by increasing the number of bits allocated in the frame for the given transmission path. The bandwidth allocation can be modified by system configuration and control unit 107 instructing frame formatter 129 through bus 131. The frame is encoded into symbols and modulated by symbol encoder/modulator 133, and the resulting signal is transmitted over transmission medium 137.

Figure 2:
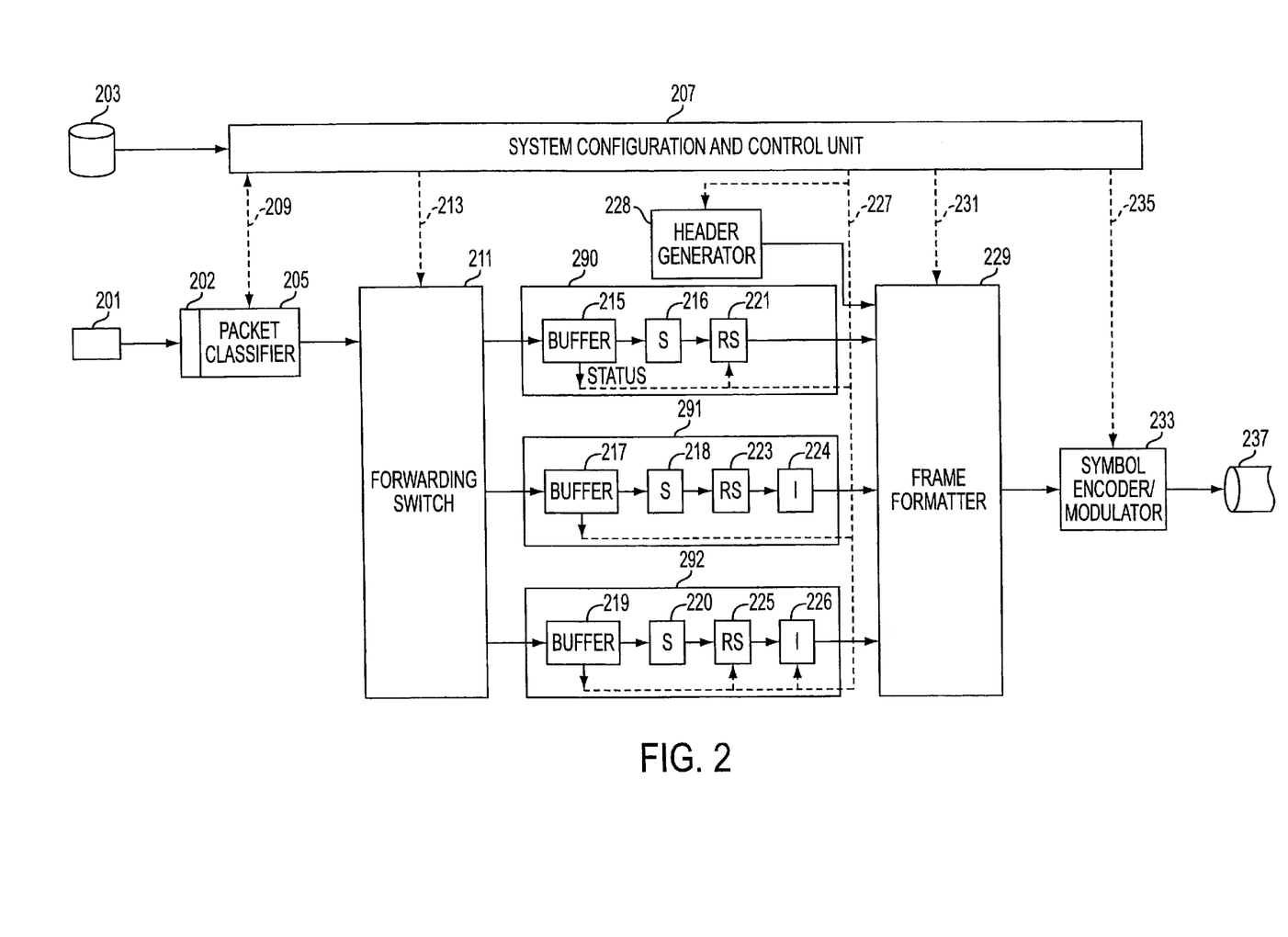
FIG. 2 shows an architecture that utilizes Reed-Solomon coding and interleaving in accordance with the architecture shown in FIG. 1.

FIG. 2 shows an architecture that utilizes Reed-Solomon coding and interleaving in accordance with the architecture that is shown in FIG. 1. Numbered components in FIG. 2 correspond to similarly-numbered components in FIG. 1. However, transmission path 290 comprises buffer 215, scrambler 216, and Reed-Solomon coder 221; transmission path 291 comprises buffer 217, scrambler 218, Reed-Solomon coder 223, and interleaver 224; and transmission path 292 comprises buffer 219, scrambler 220, Reed-Solomon coder 225, and interleaver 226. Scramblers 216, 218, and 220 randomize the bits in packet 201 in order to achieve a uniform usage of the frequency spectrum of transmission medium 237. Reed-Solomon coder 221, 223, and 225 encode scrambled packet 101 using a Reed-Solomon code. Reed-Solomon coding is well known in the art. A Reed-Solomon code is chosen according to the number of information bits in packet 201 and the code robustness that is necessary for providing the desired packet error rate. However, a greater degree of robustness typically corresponds to a greater time latency resulting from the processing of packet 201 by Reed-Solomon coder 221, 223, and 225. Interleaver 224 and 226 reorder processed packet 201 so that no two adjacent bits, group of bits, or bytes are adjacent after reordering. As known in the art, interleaving provides greater immunity to burst errors and is used in conjunction with block coding (e.g. Reed-Solomon code, Bose, Chaudhuri, and Hocquenghem code, or Hamming code).

The architecture in FIG. 2 also includes header generator 228. A header is multiplexed into the physical frame structure of the frame by frame formatter 229. The header includes information such as the encoding algorithm utilized by error correction units 221, 223, and 225 and the boundaries within the frame that are associated with each of the transmission paths 290, 291, and 292.

As can be appreciated by one skilled in the art, the architectures depicted in FIGS. 1 and 2 can be implemented with hardware such as Application Specific Integrated Circuit Chips (ASIC), with software using a microprocessor or a digital signal processor, or with a combination of hardware and software.

Figure 3:
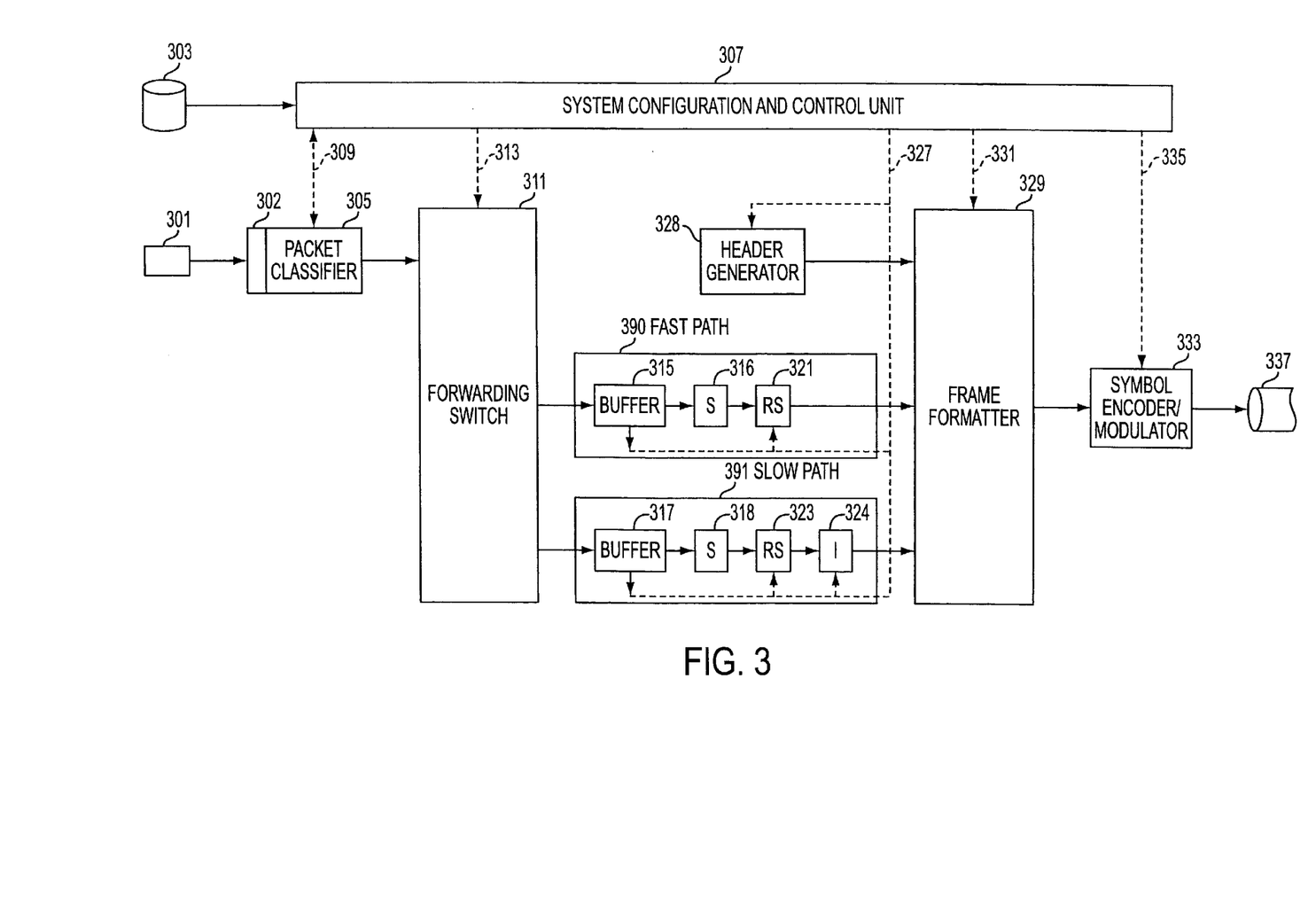
FIG. 3 shows a functional diagram for implementing the present invention in conjunction with DSL.

FIG. 3 shows a functional diagram for implementing the present invention in conjunction with a Digital Subscriber Line (DSL). DSL can provide a subscriber of a telephone high-speed data access of as much as 8 Mbps downstream and somewhat fewer bits per second upstream. Numbered components in FIG. 3 correspond to similarly-numbered components in FIG. 2. Transmission path 390 (comprising buffer 315, scrambler 316, and Reed-Solomon coder 321) is designated a "fast path" because transmission path 390 is associated with a small time latency. Transmission path 391 (comprising buffer 317, scrambler 318, Reed-Solomon coder 323, and interleaver 324) is designated a "slow path" because transmission path 391 is associated with a greater time latency while providing a lower PER than transmission path 390. Packet classifier 305 classifies packet 301 in accordance with the priority indicator (p value). Standard IEEE 802.1Q supports eight levels of priority varying from 0 to 7. Packet classifier directs packet 301 to the fast path (transmission path 390) for higher priority levels (larger p values) and to the slow path (transmission path 391) for lower priority levels (smaller p values).

Frame formatter 329 multiplexes packets (e.g. packet 301) with header information that is generated by header generator 328 into a frame. The frame is subsequently symbol encoded and modulated so that a signal conveying the frame can be transmitted over transmission medium 337 (typically a metallic medium with DSL offerings).

FIGS. 1, 2, and 3 show various embodiments associated with the transmission of a packet in accordance with the present invention. Moreover, in accordance with the present invention, a corresponding receiver utilizes components that perform the inverse function of the corresponding component of the transmitting portion. For example, a scrambler corresponds to a de-scrambler; a Reed-Solomon encoder corresponds to a Reed-Solomon decoder; and an interleaver corresponds to an inverse-interleaver. The receiver uses the header (generated by the header generator 228 or 328) as received in the frame to direct the packet to the appropriate transmission path. (FIG. 5, which is discussed later, illustrates both transmitting and receiving a packet over a transmission medium in accordance with one embodiment of the present invention.)

Figure 4:
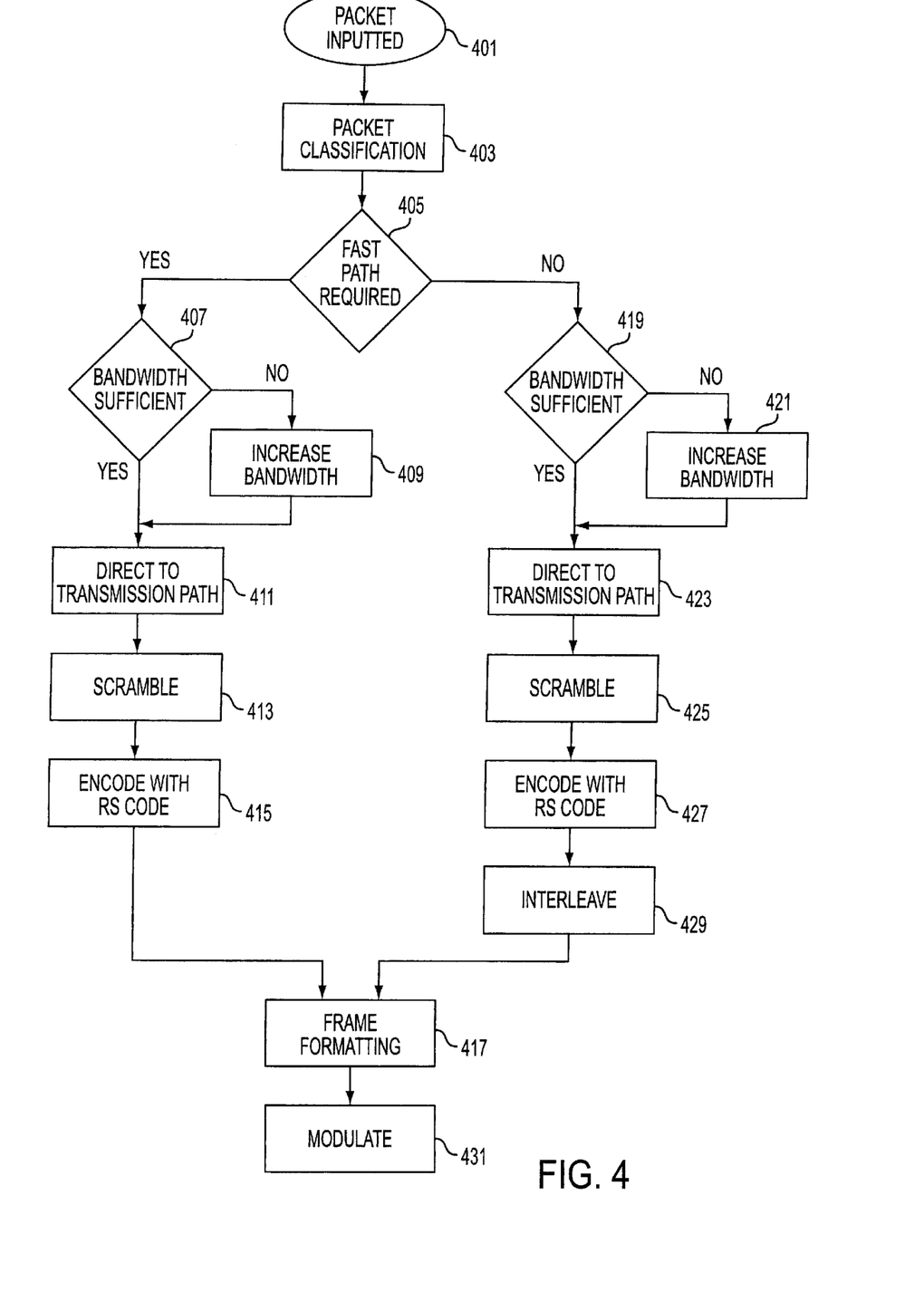
FIG. 4 shows a flow diagram in accordance with the functional diagram shown in FIG. 3.

FIG. 4 shows a flow diagram in accordance with the functional diagram shown in FIG. 3. Packet 301 is provided to packet classifier 305 through data port 302 in step 401. In step 403, packet classifier 305 utilizes the priority indicator in packet 301 and the policy information provided by database 303 through system configuration and control unit 307. Typically, policy information is configured by the system administrator in accordance with a service agreement between the service provider and the user. In step 405, packet classifier 305 determines whether packet 301 should be routed to a fast transmission path or a slow transmission path. In the exemplary embodiment, a fast transmission path corresponds to low time latency and a larger PER probability and a slow transmission path corresponds to a larger time latency and a smaller PER probability. However, alternative embodiments may utilize more than two transmission path types with varying values of QoS attributes. In the exemplary embodiment, transmission path 390 corresponds to a fast transmission path, and transmission path 391 corresponds to slow transmission path.

If step 405 determines that a fast transmission path is required, step 407 determines whether the bandwidth allocation for the fast transmission path is adequate. If not, step 409 causes the bandwidth of the fast transmission path to be increased by increasing the bit allocation in the frame as instructed to frame formatter 329. With a variation of the exemplary embodiment, packet classifier 305 can redirect packet 301 to a slow transmission path if traffic congestion exists at that point in time. In step 411, packet 301 is directed to the appropriate transmission path by forwarding switch 311. In step 413, scrambler 316 randomizes packet 301, and processed packet 301 is encoded by Reed-Solomon coder 321 in step 415. Processed packet 301 is subsequently multiplexed by frame formatter 329 in step 417. In step 431, the frame is modulated so that the corresponding signal (conveying the frame and consequently packet 301) is transmitted over transmission medium 337.

If step 405 determines that packet 301 should be processed by a slow transmission path, analogous steps are executed in steps 419, 421, 423, 425, 427, 417, and 431.

However, step 429 provides the interleaving of packet 301 in order to provide greater robustness to burst errors. Additionally, the encoding parameters for the Reed-Solomon encoding in step 427 result in more robust forward error correction coding at the expense of added time latency.

Figure 5:
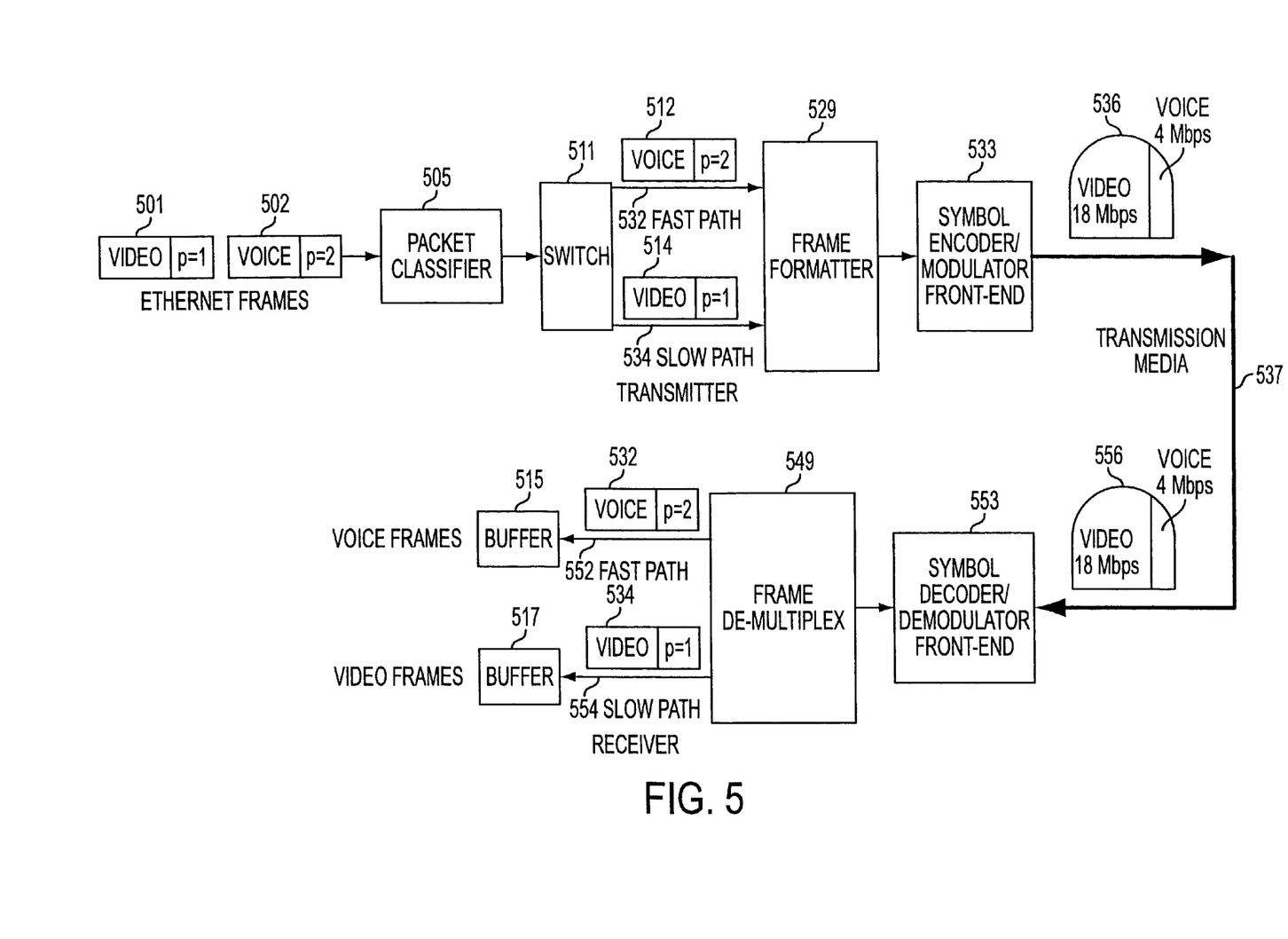
FIG. 5 shows a functional diagram for implementing the present invention in conjunction with Ethernet over VDSL.

FIG. 5 shows a functional diagram for implementing the present invention in conjunction with Ethernet over Very-high-bit rate DSL (VDSL). VDSL provides data rates on the downstream from 13 Mbps to 51 Mbps depending on transmission distance and typically a slower data rate on the upstream. The association of packets 501 and 502 is provided by system software as part of an overall QoS policy as determined by the policy management system. For example, video broadcast packets (such as packet 501) may have a priority indicator (p value) of "1", while voice packets (such as packet 502) may have a p value of "2." Packet classifier 505 reads the priority indicators in packets 501 and 502 and routes video packets (with p value of 1) to transmission path 534 that is designated as the "slow path" and routes voice packets (with p value of 2) to transmission path 535 that is designated as the "fast path." FIG. 5 does not show the processing components of transmission paths 534 and 535; however, the explanations discussed in conjunction with FIGS. 1, 2, 3, and 4 are applicable. Frame formatter 529 multiplexes packets 501 and 502 into a frame, and front-end 533 encodes symbols and modulates a signal for transmission over transmission media 537.

The VDSL receiver corresponds to front-end 553, frame de-multiplexer 549, transmission path 532, transmission path 534, buffer 515, and buffer 517. Front-end 553 performs the inverse function of front-end 533; frame de-multiplexer performs the inverse function of frame formatter 529; transmission path 532 performs the inverse function of transmission path 512; and transmission path 534 performs the inverse function of transmission path 514. Received packet 501 is stored in buffer 517 for the terminating video application, and received packet 502 is stored in buffer 515 for the terminating voice application.

It is to be understood that the above-described embodiment is merely an illustrative principle of the invention and that many variations may be devised by those skilled in the art without departing from the scope of the invention. It is, therefore, intended that such variations be included with the scope of the claims.

I claim:

1. A method for transmitting a packet in a packet network, comprising the steps of:
   (1) receiving the packet;
   (2) classifying the packet by a mechanism based upon at least one quality of service (QoS) objective in accordance with a policy;
   (3) directing the packet to one of a plurality of transmission paths in accordance with the at least one QoS objective;
   (4) encoding the packet by the one of the plurality of transmission paths; and
   (5) multiplexing a plurality of packets into a frame, the packet being contained in the plurality of packets.

2. The method of claim 1, further comprising the step of:
   symbol encoding and modulating the frame to form a signal in response to step (5).

3. The method of claim 1, wherein step (4) utilizes a Reed-Solomon code for forward error correction (FEC) processing.

4. The method of claim 1, further comprising the step of:
   scrambling the packet in response to step (3).

5. The method of claim 1, further comprising the step of:
   interleaving the packet in response to step (4).

6. The method of claim 1, wherein step (2) comprises the step of using a QoS objective associated with an originating application, a user using the originating application, and a service supported by the originating application.

7. The method of claim 1, further the step of:
   reclassifying the packet based on a loading condition of at least one transmission path.

8. The method of claim 1, further comprising the step of:
   re-allocating a bandwidth configuration of at least one transmission path in accordance with the at least one QoS objective.

9. The method of claim 1, wherein the at least one QoS objective is selected from the group consisting of a time latency, a packet error rate, a variance of the latency, and an information throughput.

10. The method of claim 1, wherein the plurality of transmission paths comprises a fast transmission path and a slow transmission path, the fast transmission path characterized by a small time latency and a small degree of error correction robustness, the slow transmission path characterized by a large time latency and a large degree of error correction robustness.

11. A method for receiving a packet in a packet network, comprising:
    (1) receiving a signal conveying a frame comprising the packet and a header;
    (2) de-multiplexing a plurality of packets from the frame, the packet being contained in the plurality of packets;
    (3) directing the packet to one of a plurality of transmission paths in accordance to the header, each of the plurality of transmission paths being characterized by a different quality of service (QoS) objective;
    (4) decoding the packet in accordance with the header; and
    (5) outputting the packet for a service.

12. The method of claim 11, further comprising the step of:
    symbol decoding and demodulating the signal in response to step (1).

13. The method of claim 11, wherein step (4) utilizes a Reed-Solomon code for forward error correction (FEC) processing.

14. The method of claim 11, further comprising the step of:
    unscrambling the packet in response to step (4).

15. The method of claim 11, further comprising the step of:
    inverse interleaving the packet in response to step (2).

16. The method of claim 11, wherein the plurality of transmission paths comprises a fast transmission path and a slow transmission path, the fast transmission path characterized by a small time latency and a small degree of error correction robustness, the slow transmission path characterized by a large time latency and a large degree of error correction robustness.

17. An apparatus for transmitting a packet from in a packet network, comprising:
    a packet classifier that classifies the packet in accordance to a quality of service (QoS) parameter;
    a first transmission path characterized by a first time latency and a first degree of error correction robustness for transmitted packets;
    a second transmission path characterized by a second time latency and a second degree of error correction robustness, wherein the second time latency is greater than the first time latency and the second degree of error correction robustness is greater than the first degree of error correction robustness for transmitted packets;
    a forwarding switch that receives the classified packet and routes the packet to either the first transmission path or the second transmission path on the basis of the QoS parameter; and
    a frame formatter coupled to an output of the first transmission path and an output of the second transmission path, wherein the frame formatter formats a frame comprising packets output by the first and second transmission paths.

18. The apparatus of claim 17, wherein the QoS parameter is received from a control unit in accordance with a policy.

19. The apparatus of claim 17, wherein the first transmission path and the second transmission path each comprises:
    a scrambler that randomizes the packet;
    an encoder coupled to the scrambler, wherein the encoder inserts coding redundancy for the packet; and
    an interleaver coupled to the encoder, wherein the interleaver interchanges bits of the packet with adjacent bits, group of bits, or bytes of an adjacent packet.

20. An apparatus for receiving a packet over a data communication channel, the packet contained in a frame, the apparatus comprising:
    a first transmission path, the first transmission path characterized by a first time latency and a first degree of error correction robustness for received packets; and
    a second transmission path, the second transmission path characterized by a second time latency and a second degree of error correction robustness, wherein the second time latency is greater than the first time latency and the second degree of error correction robustness is greater than the first degree of error correction robustness for received packets; and
    a frame de-multiplexer, coupled to the first transmission path and to the second transmission path, that receives a frame over the communication channel, separates a plurality of packets from the frame, and directs the packet to either the first transmission path or the second transmission path in accordance to a header contained in the frame, wherein the packet is contained in the plurality of packets.

21. A computer-readable medium containing instructions for controlling a computer system to transmit a packet in a packet network, by:
    receiving the packet;
    classifying the packet by a mechanism based upon at least one quality of service (QoS) objective in accordance with a policy;
    directing the packet to one of a plurality of transmission paths in accordance with the at least one QoS objective;
    encoding the packet by the one of the plurality of transmission paths; and
    multiplexing a plurality of packets into a frame, the packet being contained in the plurality of packets.

22. The computer-readable medium of claim 21, further containing instructions for controlling the computer system to transmit the packet in the packet network, by:
    symbol encoding and modulating the frame into a signal.

23. The computer-readable medium of claim 21, further containing instructions for controlling the computer system to transmit the packet in the packet network, by:
  scrambling the packet.

24. The computer-readable medium of claim 21, further containing instructions for controlling the computer system to transmit the packet in the packet network, by:
  interleaving the packet.

25. The computer-readable medium of claim 21, further containing instructions for controlling the computer system to transmit the packet in the packet network, by:
  reclassifying the packet in accordance with a current configuration of at least one transmission path.

26. The computer-readable medium of claim 21, further containing instructions for controlling the computer system to transmit the packet in the packet network, by:
  re-allocating a configuration of at least one transmission path in accordance with the at least one QoS objective.

27. A computer-readable medium containing instructions for controlling a computer system to receive a packet in a packet network, by:
  receiving a signal conveying a frame comprising the packet and a header;
  de-multiplexing a plurality of packets from the frame, the packet being contained in the plurality of packets;
  directing the packet to one of a plurality of transmission paths in accordance to the header, each of the plurality of transmission paths being characterized by a quality of service (QoS) objective;
  decoding the packet in accordance with the header; and
  outputting the packet for a service.

28. The computer-readable medium of claim 27, further containing instructions for controlling the computer system to receive the packet in the packet network, by:
  symbol decoding and demodulating the signal to detect the frame.

29. The computer-readable medium of claim 27, further containing instructions for controlling the computer system to receive the packet in the packet network, by:
  unscrambling the packet in response to decoding the packet.

30. The computer-readable medium of claim 27, further containing instructions for controlling the computer system to receive the packet in the packet network, by:
  inverse interleaving the packet in response to de-multiplexing the packet from the frame.

31. A method for transporting a packet in a packet network, comprising the steps of:
  receiving the packet from an originating application;
  classifying the packet by a policy-based mechanism in accordance with at least one quality of service (QoS) objective;
  directing the packet to either a first transmission path or a second transmission path in accordance with the at least one QoS objective, wherein the first transmission path is characterized by a small time latency, a small degree of error correction robustness, and a first bandwidth, and wherein the second transmission path is characterized by a large time latency, a large degree of error correction robustness, and a second bandwidth;
  scrambling the packet in response to directing the packet;
  encoding the packet utilizing a Reed-Solomon code in response to scrambling the packet;
  interleaving the packet in response to encoding the packet;
  multiplexing a plurality of packets into a frame in response to interleaving the packet, the packet being contained in the plurality of packets, wherein the frame comprises the packet and a header;
  symbol encoding and modulating a signal conveying the frame in response to multiplexing the packet;
  transporting the signal over a transmission medium in response to symbol encoding and modulating the signal;
  receiving the signal in response to the transporting the signal over the transmission medium;
  symbol decoding and demodulating the signal to detect a frame in response to receiving the signal;
  de-multiplexing the plurality of packets from the frame in response to symbol decoding and demodulating the signal;
  directing the packet to either a third transmission path or a fourth transmission path in accordance with the header contained in the frame, wherein the third transmission path is characterized by a small time latency, a small degree of error correction robustness, and a third bandwidth, and wherein the fourth transmission path is characterized by a large time latency, a large degree of error correction robustness, and a fourth bandwidth;
  inverse interleaving the packet in response to directing the packet;
  decoding the packet in accordance with the header utilizing the Reed-Solomon code in response to inverse interleaving the packet;
  unscrambling the packet in response to decoding the packet; and
  outputting the packet to a terminating application in response to unscrambling the packet.

32. The apparatus of claim 20, further comprising:
  a descrambler that unscrambles the packet;
  a decoder that is coupled to the descrambler, wherein the decoder removes coding redundancy for the packet; and
  an inverse interleaver that is coupled to the decoder, wherein the inverse interleaver inversely interchanges bits of the packet with adjacent bits, groups of bits, or bytes of an adjacent packet.

* * * * *